United States Patent [19]

Mathus

[11] 3,736,036

[45] May 29, 1973

[54] STORAGE SYSTEM FOR TAPE CASSETTES

[75] Inventor: Gregory Mathus, Cambridge, Mass.

[73] Assignee: Data Packaging Corporation, Cambridge, Mass.

[22] Filed: Jan. 19, 1972

[21] Appl. No.: 219,086

[52] U.S. Cl. ......................312/285, 312/11, 312/202

[51] Int. Cl. ....A47b 81/00, A47b 81/06, A47b 53/00

[58] Field of Search......................312/201, 202, 285, 312/10, 11, 350, 351, 234; 211/40, 41, 126; 206/62 R, 73 R, DIG. 36

[56] References Cited

UNITED STATES PATENTS 3,554,429 1/1971 Cohen ..............................206/73 X 3,608,739 9/1971 Duboff..................................211/40

FOREIGN PATENTS OR APPLICATIONS 968,966 12/1950 France ...............................312/285

*Primary Examiner*—Paul R. Gilliam

*Attorney*—Wolf, Greenfield and Sacks

[57] ABSTRACT

A storage cabinet for cassettes, either boxed or unboxed, comprising a turret with four side members, each of which has a compartment to receive boxed and unboxed cassettes. Each compartment is defined by two opposite pairs of supports, each of which carries dividers that describe pockets in the compartment to support either boxed or unboxed cassettes within the same volume.

4 Claims, 4 Drawing Figures

STORAGE SYSTEM FOR TAPE CASSETTES

INTRODUCTION AND BACKGROUND OF INVENTION

This invention relates to the storage of cassettes, and more particularly comprises a cabinet capable of storing either boxed or unboxed cassettes. As used herein, the word "cassettes" includes not only the conventional reel-to-reel cartridges with 0.150 inch tape, but endless four and eight track 0.250 inch tape cartridges and other enclosed tape systems as well.

Magnetic tape cassettes have in recent years become extremely popular. They have gained a substantial portion of the market formally held exclusively by disc-type recordings because of their durability, size, and ability to reproduce sound faithfully.

Literally millions of prerecorded tape cassettes are now sold weekly in the music industry. While the cassettes are much smaller than disc recordings, they nevertheless do present certain storage problems. Because they are very small, they are easily lost, and they cannot be stored conveniently on bookshelves because they are too small efficiently to utilize bookshelf-size storage areas. Another difficulty encountered with the storage of cassettes arises from the fact that they are stored either boxed or unboxed. Obviously the boxes occupy a somewhat greater volume than the unboxed cassettes, and therefore they do not stack or store neatly in mixed quantities of boxed and unboxed cassettes. Moreover, pockets designed to receive an unboxed cassette are too small to receive the cassette boxes, and conversely, pockets designed to receive the boxes are really too large for the unboxed cassettes.

One important object of this invention is to provide a storage compartment which is designed to receive interchangeably either boxed or unboxed cassettes.

Another object of this invention is to provide an attractive cassette storage cabinet having a plurality of storage compartments, each of which interchangeably may store boxed and unboxed cassettes.

Yet another object of this invention is to provide a turret-type table top cassette storage cabinet which neatly, securely, and attractively interchangeably receives boxed and unboxed cassettes.

To accomplish these and other objects, the storage cabinet of this invention includes at least one storage compartment defined by two pairs of supports, each of which carries a plurality of dividers which describe pockets for holding unboxed cassettes arranged in one direction and boxed cassettes arranged in another direction.

DETAILED DESCRIPTION

Figure 1:
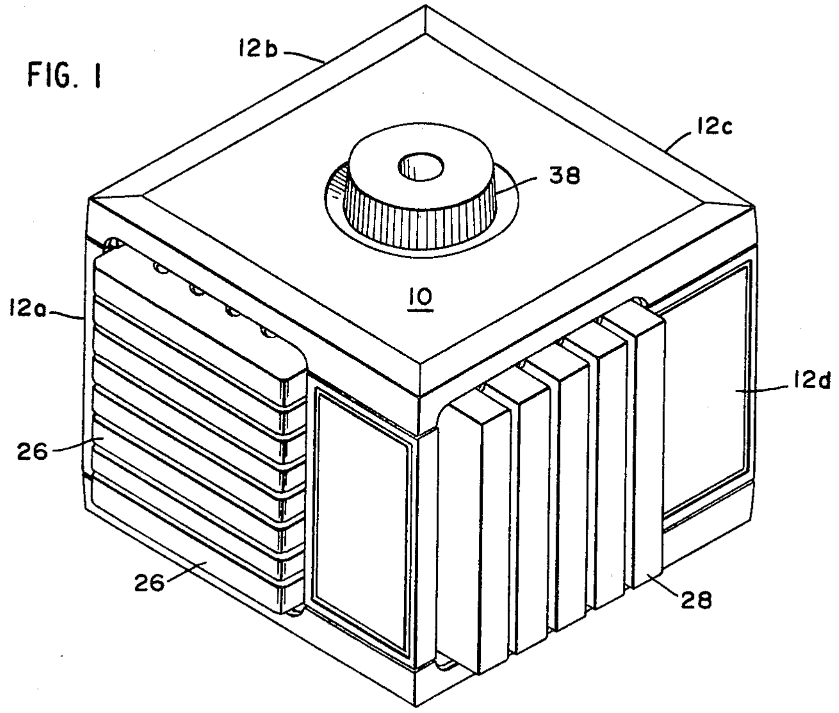
FIG. 1 is an isometric view of a storage cabinet for cassettes constructed in accordance with this invention.
Figure 2:
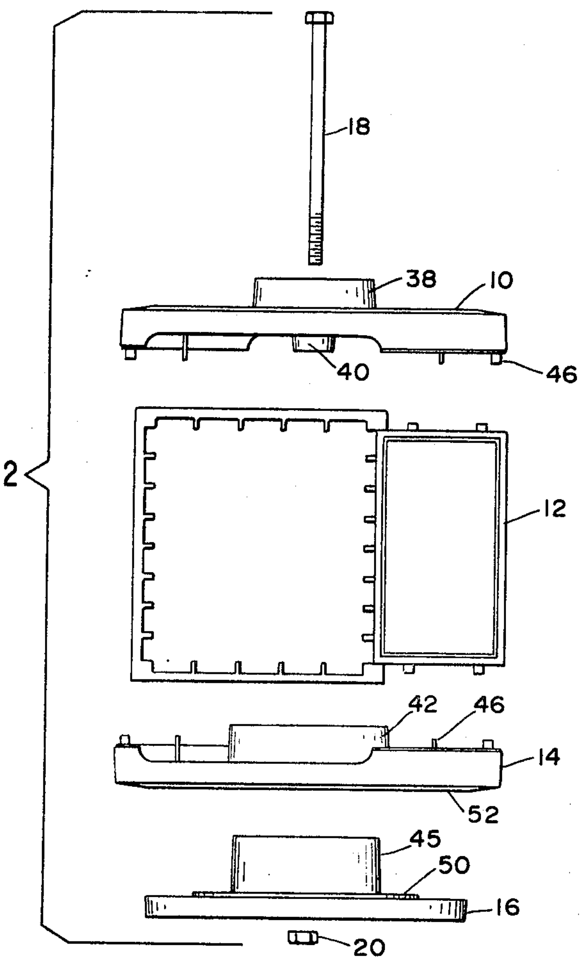
FIG. 2 is an exploded side view of the cabinet shown in FIG. 1.

The storage cabinet showed in the drawing is basically composed of seven parts; namely, a top 10, four identical side members 12, bottom 14, and base 16. The assembly is held together by an elongated bolt 18 and cooperating nut 20, which serves as a shaft for the assembly. The top 10, side members 12, and bottom 14 rotate as a unit about the shaft 18 on the base 16.

Figure 3:
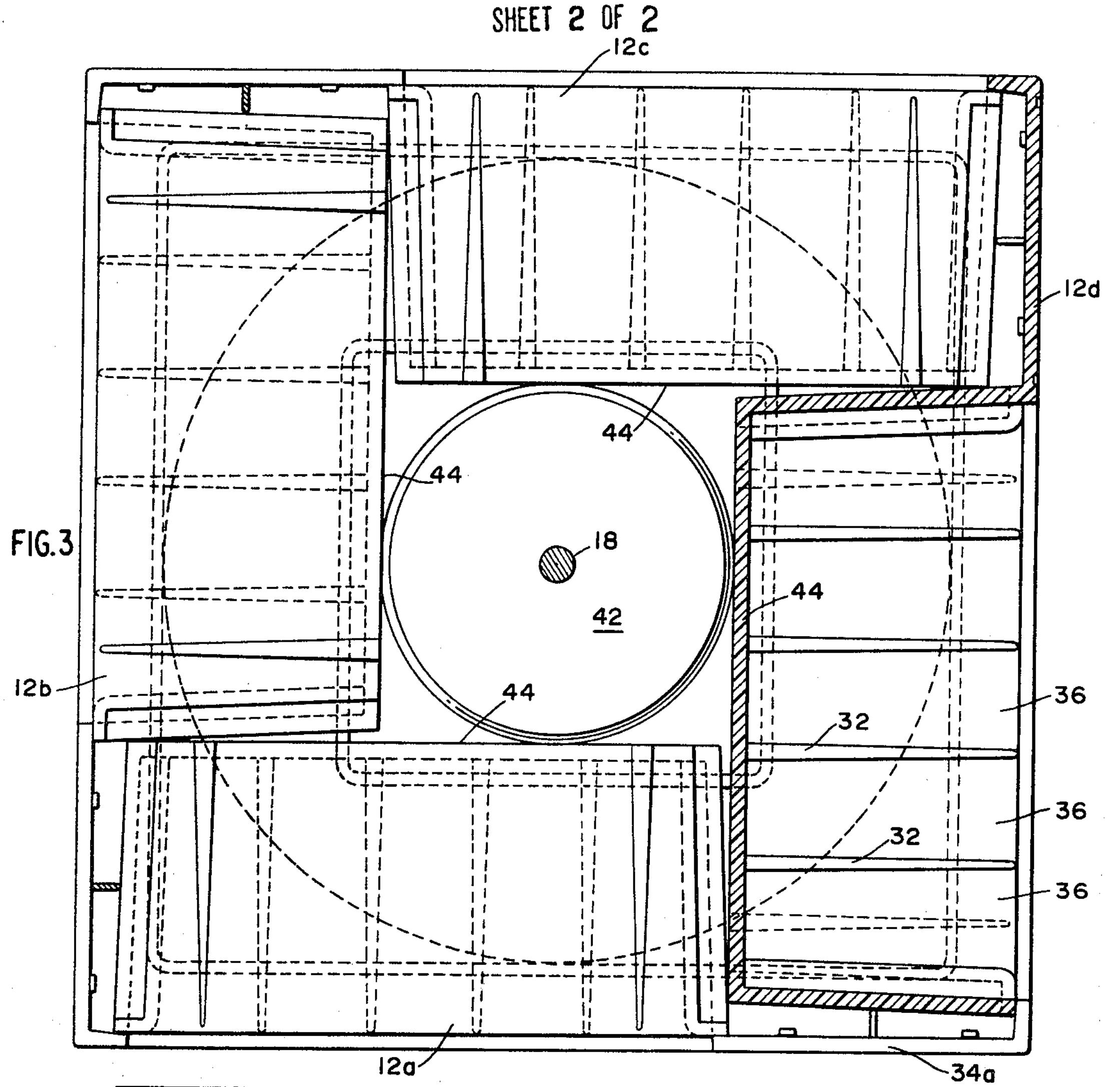
FIG. 3 is a plan view of the storage cabinet shown in FIG. 1 with the top removed and with one side member shown in section.

The four side members 12 identified by letters *a* to *d* in FIGS. 1 and 3 are identical, and each includes two pairs of supports **22*a* and 22*b*, and 24*a* and 24*b*. The supports 22*a* and 22*b* are walls oriented in generally parallel vertical planes, while the supports 24*a* and 24*b* are walls oriented in generally parallel horizontal planes. The four supports together define a compartment of generally rectangular cross section, which is designed to receive unboxed cassettes in a horizontal array and boxed cassettes in a vertical array. Thus, the vertical supports 22*a* and 22*b* are spaced apart a distance just slightly greater than the width of the cassettes to be stored in the cabinet, while the horizontal supports 24*a* and 24*b* are spaced apart a distance slightly greater than the width of the cassette boxes. This is shown in FIG. 1 when cassettes 26 are stored in the compartment side of member 12*a* and boxed cassettes 28 are stored in the compartment of member 12*d*. It is also suggested in FIG. 4 by the broken lines 26 which represent the outline of unboxed cassettes and the broken lines 28** which represent the cassette boxes.

Figure 4:
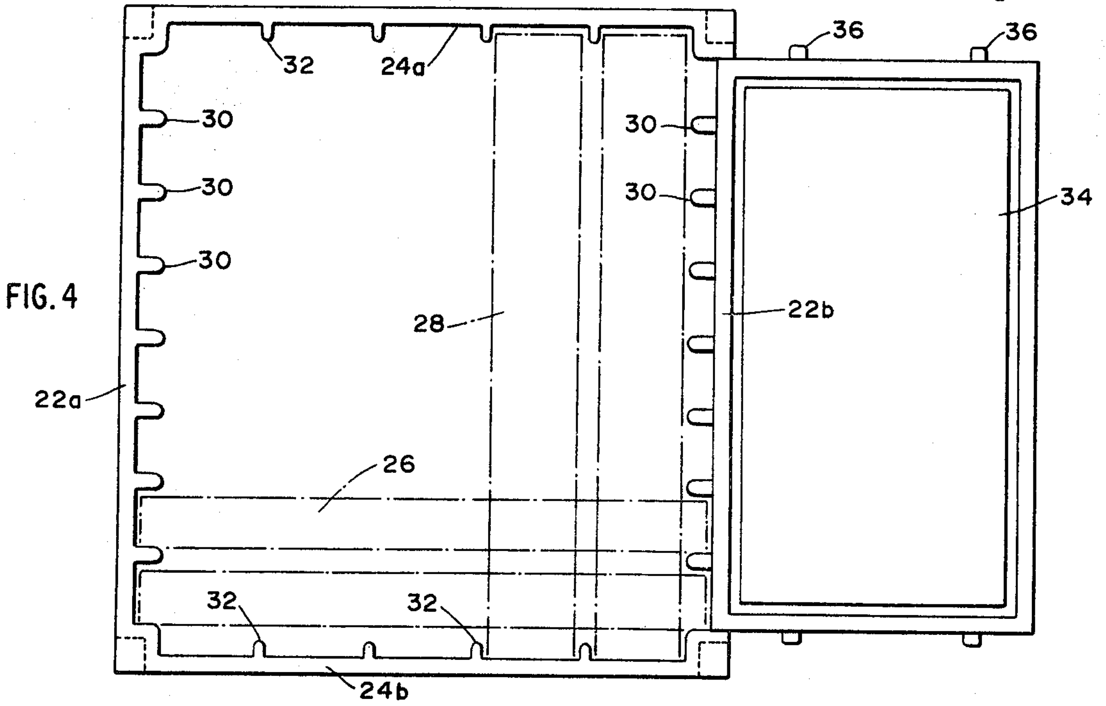
FIG. 4 is an elevation view of one of the side members.

A number of dividers 30 formed as ribs on the inner faces of the supports **22*a* and 22*b* describe pockets which are designed to receive the cassettes 26. Similar dividers 32 are formed on the inner surfaces of the supports 24*a* and 24*b* to provide vertical pockets for the cassette boxes 28. It is evident that the boxes must be somewhat larger than the cassettes, and the broken line representations of those elements bear out that relationship. The pockets defined by the four supports and dividers as shown in FIG. 4** are sized to receive either five boxed cassettes or eight unboxed cassettes.

A panel 34 is secured to the support 22 in the plane of the front of the compartment and effectively defines the depth of the storage compartment in the adjacent side member, which depth receives the depth dimension of the boxes or cassettes. This is evident in FIG. 3 where the panel **34*a* forming part of side member 12*a* is equal in width to the depth of the compartment in member 12*d***.

The four side members 12 are provided with pins 36 and flanges (not shown) which cooperate with the top and bottom members 10 and 14 to assemble the various parts together as shown in FIG. 1. The top 10 includes a knob 38 and a depending collar 40 at its center which receive the elongated bolt 18 and facilitate rotation of the cabinet on the base 16. An upstanding collar 42 is provided on the bottom 14 which serves as a spacer for the several side members 12. As shown in FIG. 3, the collar 42 bears against the inner surfaces of the rear walls 44 of each of the side members 12 so as to orient the four side members with respect to the several flanges 46 molded as integral parts of the top and bottom.

The base 16 rotatably supports the bottom 14 by means of its post 45 which fits within collar 42 and a bearing surface 50 that carries bottom face 52 of bottom 14. A washer or other device (not shown) may be used to reduce the frictional contact between bottom 14 and base 16.

In the preferred form, the four side members 12 are identical, and each may be molded of a plastic material such as high impact styrene and as an integral unit composed of the supports 22 and 24, dividers 30 and 32, and panel 34. Similarly, the top 10, bottom 14, and base 16 may be separately molded of plastic to reduce the cost of the cabinet.

In FIG. 1, the unboxed cassettes 26 are shown mounted in the compartment defined by the side member 12a, and the boxed cassettes 28 are shown mounted in the compartment defined by side member 12*d*. It is evident that the owner has his choice of how he wishes to utilize the four storage compartments within the cabinet.

Typically the cassettes are approximately ½ × 2 1/2 × 4 inches, and the boxes are approximately ⅝ × 2 3/4 × 4 3/8 inches. When the cabinet is designed to store boxed and unboxed cassettes of that size, the overall dimensions of the cabinet may be approximately 7 × 7 × 7 inches. The cabinet is suitable for use on a table top and is a decorative piece which may be placed beside the electronic component on which the cassettes are utilized. In the small space indicated, the cabinet may store as many as 32 unboxed cassettes or 20 boxed cassettes, or some intermediate number of mixed cassettes, boxed and unboxed.

Having described this invention in detail, those skilled in the art will appreciate that modification may be made of the invention without departing from its spirit. Therefore it is not intended that the scope of the invention be limited to the specific embodiment illustrated and described. Rather, the scope of the invention is to be determined by the appended claims and their equivalents.

What is claimed is:

1. A storage cabinet for cassettes either boxed or unboxed comprising a polygonal-shaped cabinet defining a plurality of storage compartments on its sides, each of said compartments being defined by two pairs of supports that describe a generally rectangular storage compartment, a plurality of dividers on one of said pair of supports describing pockets of a first size for holding a plurality of unboxed cassettes in said compartment in parallel array, and another group of dividers on the other pair of said supports describing pockets of a second size different from said first size and generally perpendicular to the first named pockets for holding a plurality of boxed cassettes in said compartment, said pockets utilizing the same volume in said compartment, and a turret, said polygon-shaped cabinet being mounted on said turret, each of said compartments being open on the outside of the cabinet in planes parallel to the turret axis.

2. A storage cabinet for cassettes either boxed or unboxed as described in claim 1 further characterized by two of said supports of each compartment being horizontal and the other supports of each compartment being vertical and with the storage compartments being open in the front each in a substantially vertical plane, a plurality of panels with one panel disposed beside each one of said compartments and secured to one of the vertical supports and lying substantially in the plane of the open front of said compartment, said last-mentioned panel, pairs of supports and dividers comprising a side member for the cabinet, and three additional side members like the first described side member and arranged to form a box shaped cabinet, the panel on each of the side members defining the depth of compartment in the adjacent side member.

3. A storage cabinet for cassettes either boxed or unboxed as described in claim 2 further characterized by said turret including a top, bottom and base, said top and bottom engaging the side members to retain them in assembled arrangement on the base, and means enabling the top and bottom with the side members to rotate about a vertical axis on the base.

4. A storage cabinet for cassettes either boxed or unboxed as defined in claim 3 further characterized by the side members each including its pairs of side supports, dividers and panel being formed as a unitary structure, and said top, bottom and base each being separately formed as unitary structures, and a shaft extending from the top through the bottom to the base to maintain the parts in assembled relationship.

* * * * *